United States Patent [19]

Goldberger et al.

[11] Patent Number: 4,560,409

[45] Date of Patent: Dec. 24, 1985

[54] METAL BEARING GRAPHITIC CARBONS

[75] Inventors: William M. Goldberger; Allan Reed, both of Chicago, Ill.

[73] Assignee: Superior Graphite, Chicago, Ill.

[21] Appl. No.: 645,331

[22] Filed: Aug. 29, 1984

[51] Int. Cl.$^4$ .................. C22C 33/08; C01B 31/04
[52] U.S. Cl. .................. 75/130 R; 423/448; 423/460
[58] Field of Search ............ 423/460, 461, 448; 75/130 R

[56] References Cited

U.S. PATENT DOCUMENTS 3,927,187 12/1975 Luhleich .................. 423/448

Primary Examiner—Peter D. Rosenberg
Attorney, Agent, or Firm—Robert M. Ward

[57] ABSTRACT

This invention relates to the production of a unique class of granular graphitic carbon materials containing metallic elements dispersed throughout the graphitic structure. More specifically, the unique class of products contain elements that enhance the controlled nucleation of dissolved carbon during the solidification of molten cast irons and are of particular value in the manufacture of quality iron castings. Moreover, the chemical form of the selected metallic elements and their high degree of dissemination within and throughout a graphitic carbon structure has been shown to provide special properties that increase the controlled nucleating or "inoculating" ability of the products of this invention over that obtained by use of the components added individually or in a simple mixture to molten cast iron.

24 Claims, No Drawings

METAL BEARING GRAPHITIC CARBONS

BACKGROUND OF THE INVENTION

This invention relates to the production of a unique class of granular graphitic carbon materials containing metallic elements dispersed throughout the graphitic structure. More specifically, the unique class of products contain elements that enhance the controlled nucleation of dissolved carbon during the solidification of molten cast irons and are of particular value in the manufacture of quality iron castings. Moreover, the chemical form of the selected metallic elements and their high degree of dissemination within and throughout a graphitic carbon structure has been shown to provide special properties that increase the controlled nucleating or "inoculating" ability of the products of this invention over that obtained by use of the components added individually or in a simple mixture to molten cast iron.

Commercial cast irons are iron alloys containing 2–4 percent dissolved carbon and 1–3 percent silicon. On cooling and solidification of the molten iron, the presence of silicon causes the dissolved carbon to precipitate as a crystalline form of graphite rather than the brittle iron carbide $Fe_3C$ (Cementite).

The form in which the graphite precipitates from the melt is extremely important to the type and quality of the iron castings made. In "grey" iron castings, the graphite has been precipitated in the form of flakes; whereas in nodular or ductile iron, the graphite has precipitated in spherical form. As a result of the different morphologies of the precipitated graphite structure, the iron castings obtained have very substantially different properties and commercial uses. For example, grey cast irons have relatively poor mechanical properties; however, "nodular" iron has excellent mechanical working characteristics and is finding increasing markets.

One key factor in determining the shape and size of the graphite formed is the rate of graphite precipitation. Liquid iron can be cooled to well below the equilibrium temperature for crystallization of graphite and thus be "super-cooled" relative to its carbon content in a manner analgous to the super-cooling of aqueous salt solutions. A high degree of super-cooling, also termed "undercooling" is undesirable in that precipitation of cementite occurs before the graphite precipitates. The cementite is extremely brittle and the casting is very difficult to machine and has relatively poor strength. Moreover, molten cast iron that is supercooled is in a thermodynamically unstable condition and once nucleated, graphite precipitation can be extremely rapid and the ability to control either the size or shape of the precipitated graphite is lost.

Much of the development of modern iron foundry technology relates to the understanding and control of the precipitation of graphite during solidification of molten cast irons. Present practice employs the addition of inoculant materials to the melt. These inoculants often are ferro-silicon base alloys containing other elements in solid solution which serve to nucleate the graphite precipitation and thus prevent "undercooling" or excessive "chill". In addition to "seeding" the precipitation of graphite from the melt, certain elements used in the inoculants are also able to influence the characteristic shape of the graphite formed. As noted, the properties of the resulting casting are directly related to the degree of graphite precipitation and the size and shape of the graphite. With the increasing need for higher strength, lighter, thinner wall castings, the control requirements are continually becoming more rigid and metallurgists are seeking better methods and additive materials to improve their ability to control the cast iron process.

The addition of graphite carbon to molten iron before casting is a well known means to promote the nucleation of graphite from the melt and thereby prevent undercooling during solidification. It is recognized that the carbon additive must have a high degree of graphite crystallinity in order to provide appropriate "nucleation sites" for precipitation of graphite from the melt. Non-graphite carbons such as petroleum coke, metallurgical coke or baked carbon scrap are not effective inoculants. Graphite materials that are available for this purpose are either natural mineral graphite or synthetic graphite such as electrode scrap graphite.

Despite the recognized ability of crystalline graphite to serve as an inoculant, the use of graphite has several disadvantages. First, the mineral graphites that are available in large tonnage and reasonable cost contain ash forming components as impurities. These gangue materials comprise various silicate and clay minerals which can vary considerably in amount and composition even from the same mineral deposit and their use leads to problems in establishing uniform addition of graphite. More importantly, the gangue materials are slag formers and can easily upset the control of the fluidity of the slag and thereby create difficult problems in handling and transfer of the hot metal. The use of synthetic graphite, although a highly pure form of graphite with essentially no slag forming constituents, is readily dissolved into the melt. The extremely rapid dissolution of this form of graphite into the molten iron rapidly depletes the melt of nucleation sites and the effectiveness of synthetic graphite "fades" too rapidly to be entirely effective. Moreover, synthetic graphite does not contain elements that serve as deoxidizers and desulfurizers such as aluminum, calcium or magnesium or other elements such as those of the rare-earth group of elements which are commonly used in foundry practice to increase the tensile strength, provide nucleation sites, and to promote the formation of spherical graphite as required to make nodular iron. Thus despite the ability of graphite materials to inoculate cast iron compositions, graphite is rarely used alone. The foundry operators therefore must use various mixtures of materials that are generally not available from a single supplier and often not made specifically for foundry application and must be mixed at the foundry leading to undesired auxiliary operations, more possibilities for material losses, furnace control problems and generally decreased operating efficiencies. Therefore, significant improvement in the efficiency foundry operation would be possible if inoculant materials were available having the appropriate sizing and carefully controlled and chemically combined active elements that could be used as single additions to achieve the desired control of the graphite precipitation and the resulting properties wanted in the cast iron products being made.

It is the objective of the process and products of this invention to produce a graphitic carbon material that will serve as effective inoculants to allow the controlled precipitation of graphite from molten cast irons during solidification. It is a further objective to provide a graphitic carbon material that when added to molten cast iron yields nucleation sites that can be retained within the melt for a sufficient period to achieve uniform castings without need for repeated inoculation. Additionally, it is the objective of this invention to produce materials that enhance the precipitation of graphite in spherical or nodular form. It is a further objectives of this invention to achieve a granular addition product that can be readily handled by foundry operators without generating dusts and which contain all active ingredients in chemically combined form that will be used with high metallurgical efficiency. And finally, it is the objective of this invention to produce such inoculant products in a continuous, energy efficient manner that is carefully controlled and environmentally acceptable.

SUMMARY OF THE INVENTION

We have found that the furnace system and method of operation described for heat treating carbonaceous material can be modified and used to accomplish the objectives of this invention. As noted in U.S. Pat. No. 4,160,813, a free flowing granular carbonaceous material derived from petroleum coke can be converted from a molecularly amorphous form of carbon into a free flowing granular product exhibiting substantial graphite crystallinity. Moreover, the methods and apparatus previously described have the capability to process carbonaceous materials at temperatures well in excess of 2000 C. and thus are capable of desulfurizing carbonaceous materials and forming graphitic carbon products containing extremely low residual sulfur levels; for example well below 0.05 percent sulfur.

We have found that after producing a desulfurized and graphitic carbon material as by the methods and apparatus previously described, that various metallic elements can be introduced into this graphitic material in a manner to combine chemically with the graphitic carbon to yield a product containing metallic elements in the form of carbides, nitrides or carbo-nitride type chemical complexes that will enhance the inoculating properties of the graphitic carbon. Such metal containing graphite carbon products are unique in that the introduced elements may be so intimately dispersed throughout the graphitic carbon structure that they cannot be detected microscopically or by other optical methods, nor when subjected to x-ray crystallographic analyses do they respond with previously established crystal structure patterns. Physico-chemical analyses therefore indicates that these products containing such inoculation enhancing metallic elements form heretofore unknown complexes of the elements with carbon and also with nitrogen when that gas is used in the operation of this process. Additionally, the results of studies made on the products of this invention indicate that such elements may be partially soluble within graphite lattice structure such as by substition for carbon atoms within that structure and they may also reside between the basal layer planes of the graphite crystal lattice to form intercalated graphite products. The highly disseminated complexing of the graphite structure with selected metallic elements provides a unique ability to control the performance of the graphitic carbon as an inoculant for cast irons. Thus selected elements can be incorporated as desired into the graphitic structure as for example to achieve strengthening of the casting by deoxidation and desulfurization of the molten iron or to enhance the tendency for nodular graphite to precipitate thus enable improvement in control of the production of nodular or ductile type iron castings.

Further, we have found a surprising and unexpected result of complexing the graphitic structure with metallic elements. When such complexed products as made by the method of this invention are added to molten iron, the rate of solution of the graphite is delayed due to presence of and/or the formation of components that are not soluble in molten iron having compositions generally used in cast irons. For example, when rare earth elements are added, these elements are reactive with residual oxygen and sulfur in the iron melt to form non-soluble oxides and sulfides. The formation of these non-soluble products thereby retards the dissolution rate of the graphitic carbon reducing substantially the "fading" of nucleation sites that otherwise is known to occur.

DETAILED DESCRIPTION OF PREFERRED EMBODIMENTS

As an example of the method and product of this invention, Desulco material, which is a highly purified and desulfurized graphitic carbon, was used in the particle size range between 20 and 65 Tyler mesh size (0.210–0.841 mm) and heated by direct electrothermal resistive heating to 2000 C. while in a fluidized state using nitrogen gas as the fluidizing medium in the apparatus of the type described in U.S. Pat. No. 4,160,813 and No. 4,288,407. The Desulco material was continuously introduced into the furnace and the heated continuously product removed at a uniform rate of approximately 34 Kg/hr (75 lb/hr). After steady state temperature conditions were established, a well mixed blend of Desulco and a rare-earth oxide material derived from Mountain Pass, Calif. bastnasite ore (Union Moly Corp. Product No. 4100) mixed in the proportion of 100 Kg of Desulco and 20 Kg of rare-earth oxide was fed at constant feed rate of about 34 Kg/hr while discharging continuously to maintain a steady state inventory in the furnace. The operation was continued until 190.5 Kg (420 lbs.) of steady state representative product material was obtained. This material was found to have a particle density of 1.66 g/cc. This material was analyzed and give the following results:

TABLE 1

| BASIC CHEMICAL ASSAY | |
| --- | --- |
| Component | Analysis, Percent |
| Carbon | 99.1 |
| Ash | 0.9 |
| Sulfur | 0.01 |

The material was found to be slightly reactive with water and gave a distinct ammoniacal odor suggesting the presence of carbides and nitrides.

Semi-quantitative spectrographic analyses of this product established the presence of rare-earth or lanthanide series metals in the range 0.02–0.1 percent. However, X-ray diffraction analyses showed no crystalline material other than graphite. The ash obtained by ignition of a sample of this product showed crystallinity suggesting a solid solution of the oxides of the lanthanide series elements of cerium, lanthanum, neodynium and possibly others.

This material was used in metallurgical tests to determine its effectiveness as an inoculant for grey cast iron and was shown to give substantially higher cell counts, more resistance to fading of nucleation sites than the Desulco graphitic carbon alone.

In a further sequence of experiments conducted at a furnace temperature of 1850 C., the same rare-earth oxide concentrate material was fed as a blend with Desulco graphitic carbon into the electrothermal fluidized bed furnace as a 25 weight percent mixture using a separate feed system. Desulco was also introduced through a separate feeder. The two feed streams were introduced at the same position in the furnace and the feed rate controlled to give a combined feed rate of 61.2 Kg/hr (135 lb/hr) with a rare-earth oxide rate equivalent to approximately 1.5 percent in the feed and later to 3 percent in the feed during two consecutive periods of steady state production. Approximately 160 and 320 Kg of each product was made during steady operating periods of about 3 hours and 6 hours respectively.

These products identified as HREC 95A and HREC 95B were examined by various analytical techniques and the following results obtained:

TABLE 2

BASIC CHEMICAL ASSAY

| Component | Analyses, Percent | |
|---|---|---|
| | HREC-95A | HREC-95B |
| Carbon | 98.7 | 97.3 |
| Ash | 1.3 | 2.7 |
| Sulfur | 0.005 | 0.004 |

TABLE 3

ANALYSIS BY OPTICAL EMISSION SPECTROGRAPH

| Element | Analysis, Percent* |
|---|---|
| La*, Ce*, Nd* | 0.5–3.0 |
| V, Fe*, Al*, Si* | 0.005–0.05 |
| Ti, Be, Y | <0.005 |
| Not Detected: | |

*Analyses applies to both HREC-95A and HREC-95B materials. Elements with asterisk present in greater amount in HREC-95B sample.

To obtain a more definitive determination of the nature of the rare-earth metal compounds formed, the samples were ashed by a low temperature atomic oxygen procedure that removes carbon but leaves other species in non-oxidized form. Analyses of the resulting residues by X-ray diffraction gave the following X-ray peaks and d-spacings:

TABLE 4

X-RAY DIFFRACTION ANALYSES OF DESULCO PRODUCTS CONTAINING RARE EARTH ELEMENTS REACTED AT 1850 C.

| 2θ, deg. | d, A° |
|---|---|
| 43.9 | 2.06 |
| 30.6 | 2.92 |
| 28.1 | 3.18 |

Comparison with published data for various rare-earth compounds shows that the most intense peak for cerium nitride corresponds to a d spacing of 2.06 A° and that the cerium carbonitride complexes $CeN_{0.67}C_{0.18}$ and $CeN_{0.59}C_{0.10}$ have d spacings corresponding respectively to 2.94 A° and 2.91 A°. Therefore, the nature of the product containing rare earth elements produced as described are mainly the nitride and carbonitride of cerium and contains those other of the rare-earth or lanthanide series of elements present in the bastnasite in solid solution or also as nitride and carbonitride compounds.

In another example of the process and product of this invention, a commercial grade of burnt lime powder was blended with Desulco graphitic carbon and introduced into the electrothermal fluidized-bed furnace. The feed mixture was a well mixed blend of 10 percent by weight lime. In this case, the furnace was operated at 1650 C. Nitrogen was used as the fluidizing gas and the product was cooled in a stream of argon before exposure to the atmosphere. The furnace was operated at a steady feed and discharge rate of approximately 56.7 Kg/hr (125 lb/hr) for a sufficient period to collect about 200 Kg (420 lb) of product from the bed. The product was bound to contain 3.1 percent ash materials and was noted to exhibit reactivity with water with evolution of acetylene gas. This product was identified as HCC-73.

It should be noted that in making a Desulco product containing calcium in a chemically combined form with the Desulco carbon, the calcium reaction in the presence of nitrogen, there is a tendency for calcium to form a calcium carbonitride calcium cyanamide ($CaCN_2$). Thus the atmosphere and the temperature in the reaction of calcium takes place can be used to control the extent of cyanamide formation. This is illustrated in Table 5 which shows the chemical analyses obtained on products made when nitrogen was used to fluidize the electrothermal furnace (HCC-67); and, when argon was used for fluidization (HCC-74).

TABLE 5

CHEMICAL ANALYSES OF CALCIUM BEARING DESULCO GRAPHITIC CARBONS MADE IN NITROGEN AND ARGON

| | Analyses, Percent | |
|---|---|---|
| Component | HCC-67 (Nitrogen) | HCC-74 (Argon) |
| Carbon | 93.6 | 92.5 |
| Calcium Cyanamide, $CaCN_2$ | 3.6 | — |
| Calcium Carbide, $CaC_2$ | 0.2 | 4.5 |
| Calcium Oxide, CaO | 1.8 | 1.4 |
| Silicon Carbide, SiC | — | 0.5 |

Spectrographic analyses of the product for the reaction of Desulco graphitic carbon and lime conducted in an argon atmosphere in the continuous process as described is given in Table 6.

TABLE 6

SEMI-QUANTITATIVE SPECTROGRAPHIC ANALYSES OF DESULCO BEARING CALCIUM PRODUCT HCC-74

| Element | Analyses |
|---|---|
| Calcium | ~10 Percent |
| Silicon | 1–10 Percent |
| Vanadium | 0.1–0.5 Percent |
| Iron | 100 |
| Titanium | 50 |
| Aluminum | 100 |
| Nickel | 50 |
| Zirconium | 20 |
| Boron | 5 |

These analyses show that in addition to the calcium content of the lime, other elements present in the materials fed to the furnace either associated with the lime feed or contained with the graphitic carbon can be retained in the final product provided that these elements form compounds with carbon and/or nitrogen that are stable at the operating temperature of the furnace. Such elements include calcium, silicon, aluminum, titanium, zirconium, boron and the lanthanide series elements and other elements that form high temperature stable carbides and nitrides.

To better establish the nature of the Desulco products containing calcium, samples were subjected to microscopic and X-ray analyses. The following tabulation compares the d-spacings determined by X-ray diffraction analyses of representative product samples taken from three calcium addition furnace operations. For reference, the d-spacings reported calcium carbide and calcium cyanamide in crystallographic reference standards* included in the tabulation.

*Joint Committee for Powder Diffraction Standards, 1983.

TABLE 7

COMPARISON OF D-SPACINGS DETERMINED BY X-RAY DIFFRACTION OF CALCIUM BEARING DESULCO PRODUCTS WITH REPORTED VALUES FOR CALCIUM COMPOUNDS

| CaO | $CaC_2$ (<450 C.) | $CaC_2$ (>450 C.) | $CaCN_2$ | HCC-67 Nitrogen | HCC-73 Nitrogen Argon Purge | HCC-74 Argon |
|---|---|---|---|---|---|---|
| | | | | 6.86 | | |
| | | | 4.90 | 4.87 | | 4.93 |
| | 3.32 | 3.35 | | | 3.37 | |
| | 3.15 | | | | | |
| | | 2.89 | 2.94 | 2.93 | | |
| 2.78 | 2.74 | | | 2.77 | 2.80 | |
| | | | | 2.64 | | 2.64 |
| 2.41 | | | 2.42 | 2.40 | | |
| | | | 2.17 | 2.16 | 2.15 | 2.15 |
| | | | | 2.12 | Broad Peak | Broad Peak |
| | 2.08 | 2.05 | | 2.08 | | |
| | 1.94 | | | | 2.01 | 2.01 |
| | 1.86 | | 1.85 | 1.85 | | |
| | | 1.77 | 1.76 | | | 1.79 |
| | | | 1.73 | 1.73 | | |
| | 1.66 | 1.69 | | 1.69 | | |
| | | | 1.57 | 1.56 | 1.54 | |
| 1.45 | | 1.45 | | | | |
| 1.39 | | | | | | |
| | | | | | 1.32 | |
| 1.20 | 1.23 | | | 1.23 | 1.23 | 1.23 |

The HCC-67 material was prepared using nitrogen for fluidization, the HCC-73 was made using nitrogen for fluidization and cooling the product under argon. The HCC-74 material was made using argon for fluidization and cooling. One can note that the HCC-67 has a response that includes virtually all of the reported calcium cyanamide peaks and some of the carbide peaks. The HCC-73 contains less of the cyanamide peaks and no clear carbide responses. The HCC-74 made entirely in an argon atmosphere contains even less of the cyanamide and perhaps more of the carbide. However, there appears to be response patterns in each of the calcium bearing Desulco products that fit no established crystallographic pattern and are believed to be chemical complexes and solid solutions of the calcium-carbonitride system.

Microscopy combined with X-ray analysis to make semi-quantitative analyses of individual crystals and phases observed in the calcium bearing Desulco products showed high calcium phase concentrations only in the HCC-74 product. In the HCC-73 product, calcium did not appear to be concentrated but disseminated throughout the particle, probably as a carbonitride complex.

A further example of the process and products of this invention is the production of a graphitic carbon product containing boron. In this case, anhydrous boric oxide $B_2O_3$ (U.S. Borax Grade HP-4) having a size minus 4 mesh was introduced as a blend with a delayed calcined petroleum coke and treated in the electrothermal fluidized-bed furnace at 2300 C. The feed mixture contained 5 percent boric acid by weight. The bed was fluidized with nitrogen. A total of 295 Kg (650 lb) of mixture was fed to the furnace during approximately six hours of operation at constant conditions. The product analyzed 4.7 percent ash by combustion.

Analysis of the furnace product by X-ray diffraction showed a normal graphite response with a very minor peak at $2\theta = 13.4°$ (d-spacing = 6.5 A°). The ash collected in the crucible was analyzed by X-ray diffraction and found to be $B_2O_3$. A low temperature ashing in plasma generated atomic oxygen was done and the residue examined by X-ray diffraction. In addition to $B_2O_3$, numerous peaks were observed. However, the response could not be matched with any of the previously reported patterns for boron compounds including the series of carbides $B_4C$, $B_3C_2$, $B_8C$ and $B_{25}C$. Nor did the exhibited patterns match those for nitrides, oxides or hydrides. It was concluded that the boron addition to the graphitic carbon was as a previously unreported carbonitride with substantial solid solution of the boron within the graphite structure.

The impregnation of the graphitic carbon with boron by the method of this process was found to impart a very substantial resistance to oxidation of the carbon as compared with the unboronated material treated similarly with regard to temperature history in the electrothermal fluidized bed furnace but without the introduction of boron. The loss-in-weight analyses made on such samples both with and without the boron treatment were made by holding 100 gram amounts of each sample at 815 C. (1500 F.) for five hours in air. The results reported are as follows:

TABLE 8

COMPARISON OF WEIGHT LOSS OF SAMPLES IN AIR AT 1500 F. AFTER 5-HOURS

| Weight Loss, Percent | |
|---|---|
| Desulco | Boronated Desulco |
| 52.5 | 23.5 |

It can be noted that in the preceding examples, the metallic elements to be combined with the graphitic carbon were introduced into the electrothermal fluidized-bed furnace in an oxide or oxidized form. For example, calcium was introduced as burnt lime (CaO), boron as anhydrous boric acid ($B_2O_3$). Although elements of interest might be introduced in other chemical forms, generally, the most economical source of additive elements is the form in which they are obtained from their natural mineral by concentration processing and generally heating in air. However, the choice of the starting source material for the elements to be added can be in other forms including the element in metallic form. This is the case for example, when incorporating magnesium into the graphitic structure. We have found that the process as described for adding calcium by introducing calcium oxide (lime) as the source, cannot be used in an analgous way to obtain magnesium by introducing magnesium oxide. The thermochemical behavior of magnesium carbide is such that it decomposes at a lower temperature than that required for carbothermic reduction of magnesium oxide. Therefore, it is not thermodynamically possible to achieve a magnesium carbide complex by treating the oxide with carbon by the process of this invention. However, we have demonstrated that magnesium can be complexed with graphitic carbon by introducing magnesium in metallic form and treating at temperatures in the range 900–1100 C. The product obtained has a similar high degree of dissemination of magnesium through the graphite which appears to be a carbonitride complex form not clearly identifiable by X-ray diffraction crystallography.

It is evident therefore that the process and product of this invention is not limited to any particular form of the metal to be chemically incorporated within the graphite structure. It may be added as the element or as the oxide, or in other chemical compound form. Although described in the foregoing samples as being added as a free flowing solid, it may also be added as a volatile gas; as for example a halide compound containing the desired element. The key to the satisfactory operation of this process is that the added material by chemically reactive with graphitic carbon and yield a stable carbon compound at the temperature selected for operation of the process.

Similarly, the production of a Desulco graphitic carbon containing metallic elements as described need not be limited to the introduction of an already graphitized carbon material into the electrothermal fluidized-bed furnace. As was noted in the example of making a graphitic carbon containing boron, the carbon source was calcined petroleum coke, which has no clearly defined crystallographic structure. However, in this same case, the reaction between the boron source and the carbon was conducted at 2300 C.; a temperature at which the essentially amorphous structure of petroleum coke transforms into a graphitic structure. Therefore, the product, which contains a substantial excess of carbon exhibits a typical graphite response when examined by X-ray diffraction, as previously noted. It follows that the process of this invention when operated above graphite formation temperatures can use a non-graphitic carbonaceous feed material and still produce a graphitic product. However, such carbonaceous material must be a carbon material that will be transformed into a graphitic structure (graphitizable) at the operating temperature of the process. Not all carbonaceous materials have that property. Petroleum coke is especially suitable as a carbon source when use of an already graphitic carbon material (Desulco) is not available or cost effective.

It should be noted that the principal objective of this invention is to obtain a graphitic carbon product with unique and useful properties that enhance its value relative to the Desulco graphitic carbon alone. It is therefore important to retain all the properties of graphite in the final product. In this objective, the product is a graphitic carbon that contains very low levels of other constituents and no attempt is made in the operation of this invention to produce a product comprising mainly a carbide or carbonitride or to approach a ratio of elemental carbon and the additional elements that would approach the stoichiometric ratio of any known compound of carbon with those elements. Thus the process and products of the invention will be limited generally to no more than low levels of additive elements and in no case would such addition elements exceed about 10 percent by weight in the final product.

What is claimed is:

1. The process of chemically incorporating elements within a graphitic carbon structure by reacting granular carbon with one or more desired elements in an electrothermal fluidized bed furnace.

2. The process of (1) in which the granular carbon is a graphitic carbon such as Desulco.

3. The process of (1) wherein the reactants are added continuously and the product withdrawn continuously so that the process operates in a continuous and steady-state mode.

4. The process of (1) wherein the elements incorporated are selected from the group comprising aluminum, calcium, strontium, barium, titanium, magnesium, zirconium, cerium and other rare-earth (lanthanide) elements.

5. The process of (1) wherein the element(s) to be incorporated are introduced as the oxide.

6. The process of (1) wherein the element(s) to be introduced are in metallic form.

7. The process of (1) wherein the fluidizing gas is nitrogen.

8. The process of (1) wherein the fluidizing gas is a gas that is nonreactive with either carbon or the elements added to the furnace.

9. The process of (8) wherein the fluidizing gas is selected from the group of noble gases (argon, helium, krypton, neon).

10. An iron inoculant material comprising:
a free flowing, granular, low sulfur graphitic material having a non-carbonaceous material diffused within the structure of the graphitic material, said non-carbonaceous material being selected from the group consisting of aluminum, boron, calcium, strontium, barium, titanium, magnesium, zirconium, and the lanthanide series elements.

11. The iron inoculant material of claim 10 wherein the difffused non-carbonaceous material is present in metallic form.

12. The iron inoculant material of claim 10 wherein the difffused non-carbonaceous material is present as the oxide.

13. The iron inoculant material of claim 10 wherein the difffused non-carbonaceous material is present as the carbide.

14. The iron inoculant material of claim 10 wherein the difffused non-carbonaceous material is present as the nitride.

15. The iron inoculant material of claim 10 wherein the difffused non-carbonaceous material is diffused within the graphitic material and incorporated as a solid solution.

16. The iron inoculant material of claim 10 wherein the non-carbonaceous material comprises a rare earth and is present in an amount of approximately 0.02–3.0 percent.

17. The iron inoculant material of claim 10 wherein the non-carbonaceous material comprises calcium cyanamide.

18. The iron inoculant material of claim 10 wherein the non-carbonaceous material comprises calcium carbide.

19. The iron inoculant material of claim 10 wherein the non-carbonaceous material comprises calcium oxide.

20. The iron inoculant material of claim 10 wherein the non-carbonaceous material comprises boric oxide.

21. The iron inoculant material of claim 10 wherein the non-carbonaceous material comprises a boron carbonitride.

22. The iron inoculant material of claim 10 wherein the non-carbonaceous material is partially soluble within the graphite lattice structure.

23. The iron inoculant material of claim 10 wherein a portion of the carbon atoms within the graphite lattice structure are replaced by the non-carbonaceous material.

24. The iron inoculant material of claim 10 wherein the non-carbonaceous graphite material diffused within the graphite resides between the basal layer planes of the graphite crystal lattice to form intercalated graphite products.

* * * * *